United States Patent
Moyal et al.

(10) Patent No.: US 11,200,317 B2
(45) Date of Patent: *Dec. 14, 2021

(54) SYSTEMS AND METHODS FOR PROTECTING A COMPUTING DEVICE AGAINST MALICIOUS CODE

(71) Applicant: Minerva Labs Ltd., Petach-Tikva (IL)

(72) Inventors: Omri Moyal, Nesher (IL); Erez Breiman, Tel-Aviv (IL); Eduard Bobritsky, Yahud-Monosson (IL)

(73) Assignee: Minerva Labs Ltd., Petach-Tikva (IL)

( * ) Notice: Subject to any disclaimer, the term of this patent is extended or adjusted under 35 U.S.C. 154(b) by 265 days.

This patent is subject to a terminal disclaimer.

(21) Appl. No.: 16/041,795

(22) Filed: Jul. 22, 2018

(65) Prior Publication Data
US 2020/0026855 A1   Jan. 23, 2020

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01); *G06F 21/563* (2013.01); *G06F 21/564* (2013.01); *G06F 2221/033* (2013.01); *G06F 2221/2141* (2013.01); *G06F 2221/2149* (2013.01)

(58) Field of Classification Search
CPC .... G06F 21/566; G06F 21/563; G06F 21/564; G06F 21/53; G06F 2221/2141; G06F 2221/033; G06F 2221/2149
USPC ........ 726/22, 23, 24, 26; 713/152, 164, 167, 713/190, 193, 187, 189
See application file for complete search history.

(56) References Cited

U.S. PATENT DOCUMENTS 8,135,994 B2 * 3/2012 Keromytis .......... G06F 11/3688
  714/38.11
8,195,953 B1 * 6/2012 Yue ....................... G06F 21/566
  713/187

(Continued)

FOREIGN PATENT DOCUMENTS

KR    20060133728    12/2006
KR     100996839    11/2010

OTHER PUBLICATIONS

Ex Parte Quayle Official Action dated Aug. 7, 2020 from the U.S. Appl. No. 16/041,796. (9 pages).

*Primary Examiner* — Saleh Najjar
*Assistant Examiner* — Khalid M Almaghayreh

(57) ABSTRACT

There is provided a computer implemented method of vaccination of a computing device against infection by malicious code, comprising: obtaining a vaccination profile including vaccination artifact system calls indicative of a malicious code attempting to identify another instance of the malicious code executing on the computing device prior to the malicious code infecting the computing device, monitoring the computing device for an indication of execution of at least one of the vaccination artifact system calls by the malicious code, and providing a false response to the at least one of the vaccination artifact system calls for emulating an existing infection of the computing device by another instance of the malicious code according to the indication of execution of at least one of the plurality of vaccination artifact system calls, wherein the emulation of the existing infection prevents infection of the computing device by the malicious code.

22 Claims, 2 Drawing Sheets

(56) References Cited

U.S. PATENT DOCUMENTS

| | | | |
|---|---|---|---|
| 10,318,730 B2* | 6/2019 | Treadwell | G06F 21/52 |
| 2011/0113491 A1* | 5/2011 | Altshuler | H04L 63/1425 |
| | | | 726/24 |
| 2011/0225655 A1* | 9/2011 | Niemela | G06F 21/565 |
| | | | 726/24 |
| 2011/0258165 A1* | 10/2011 | Jung | G06F 21/568 |
| | | | 707/687 |
| 2014/0237596 A1* | 8/2014 | Grytsan | G06F 21/56 |
| | | | 726/23 |
| 2016/0283716 A1* | 9/2016 | Momot | G06F 9/45558 |
| 2017/0093884 A1* | 3/2017 | Al Abdulhadi | H04L 69/08 |
| 2018/0198801 A1* | 7/2018 | Gopalakrishna | H04L 63/145 |
| 2018/0198806 A1* | 7/2018 | Gopalakrishna | G06F 21/53 |
| 2018/0198821 A1* | 7/2018 | Gopalakrishna | H04L 63/1416 |
| 2019/0121977 A1* | 4/2019 | Gordeychik | G06F 21/566 |
| 2019/0199748 A1* | 6/2019 | Gopalakrishna | G06F 21/566 |
| 2020/0026856 A1 | 1/2020 | Moyal et al. | |

* cited by examiner

SYSTEMS AND METHODS FOR PROTECTING A COMPUTING DEVICE AGAINST MALICIOUS CODE

RELATED APPLICATIONS

This application is co-filed with U.S. patent application Ser. No. 16/041,796 titled SYSTEMS AND METHODS FOR PROTECTING A COMPUTING DEVICE AGAINST MALICIOUS CODE, the contents of which are incorporated herein by reference in their entirety.

FIELD AND BACKGROUND OF THE INVENTION

The present invention, in some embodiments thereof, relates to cybersecurity and, more specifically, but not exclusively, to systems and methods for protecting a computing device against malicious code.

Malicious code is designed to cause damage to a computer, server, and/or network computing device, for example, to disrupt operation of a computer, steal data, and/or ransom a computer for money. Malware is designed to spread from one computer to another, for example, by transmitting itself over a network, injecting itself into existing code, and/or via portable storage devices. Examples of malicious code include computer viruses, worms, Trojan horses, ransomware, spyware, adware, and scareware. Malware may be implemented, for example, as executable code, scripts, and/or injection.

Anti-malware applications are continuously being developed in an effort to protect computers against infection by malicious code.

SUMMARY OF THE INVENTION

According to a first aspect, a computer implemented method of vaccination of a computing device against infection by malicious code, comprises: obtaining a vaccination profile including a plurality of vaccination artifact system calls indicative of a malicious code attempting to identify another instance of the malicious code executing on the computing device prior to the malicious code infecting the computing device, monitoring the computing device for an indication of execution of at least one of the plurality of vaccination artifact system calls by the malicious code, and providing a false response to the at least one of the plurality of vaccination artifact system calls for emulating an existing infection of the computing device by another instance of the malicious code according to the indication of execution of at least one of the plurality of vaccination artifact system calls, wherein the emulation of the existing infection prevents infection of the computing device by the malicious code.

According to a second aspect, a system for vaccination of a computing device against infection by malicious code, comprises: a non-transitory memory having stored thereon a code for execution by at least one hardware processor, the code comprising: code for obtaining a vaccination profile including a plurality of vaccination artifact system calls indicative of a malicious code attempting to identify another instance of the malicious code executing on the computing device prior to the malicious code infecting the computing device, code for monitoring the computing device for an indication of execution of at least one of the plurality of vaccination artifact system calls by the malicious code, and code for providing a false response to the at least one of the plurality of vaccination artifact system calls for emulating an existing infection of the computing device by another instance of the malicious code according to the indication of execution of at least one of the plurality of vaccination artifact system calls, wherein the emulation of the existing infection prevents infection of the computing device by the malicious code.

According to a third aspect, a computer program product for vaccination of a computing device against infection by malicious code, comprises: a non-transitory memory having stored thereon a code for execution by at least one hardware processor, the code comprising: instructions for obtaining a vaccination profile including a plurality of vaccination artifact system calls indicative of a malicious code attempting to identify another instance of the malicious code executing on the computing device prior to the malicious code infecting the computing device, instructions for monitoring the computing device for an indication of execution of at least one of the plurality of vaccination artifact system calls by the malicious code, and instructions for providing a false response to the at least one of the plurality of vaccination artifact system calls for emulating an existing infection of the computing device by another instance of the malicious code according to the indication of execution of at least one of the plurality of vaccination artifact system calls, wherein the emulation of the existing infection prevents infection of the computing device by the malicious code.

At least some of the systems, methods, apparatus, and/or code instructions described here relate to the technical problem of protection against infection by malicious code.

At least some of the systems, methods, apparatus, and/or code instructions described herein improve the technology of cybersecurity, by improving the ability of a computing device (e.g., client terminal, server, networking device) to protect itself again infection by malicious code. In particular, improving the ability of the computing device to emulate an existing infection by malicious code, for preventing infection of the computing device by another instance of the malicious code.

At least some of the systems, methods, apparatus, and/or code instructions described herein are related to a vaccination profile that is used to emulate infection of the computing device to malicious code that is attempting to infect the computing device. The emulated infection prevents the malicious code from infecting the computing device.

At least some of the systems, methods, apparatus, and/or code instructions described herein provide technical improvements and/or technical advantages over other cybersecurity methods that protect against infection by malicious code. For example, the vaccination profile described herein prevents infection by the malicious code by emulating an already present infection of an instance of the malicious code to the malicious code attempting infection. The malicious code, which is programmed to avoid re-infection of the computing device, aborts the attempt to infect the computing device based on the emulated infection which is generated according to the vaccination profile. In another example, at least some of the systems, methods, apparatus, and/or code instructions described herein provide protection to a computing device prior to infection by the malicious code, in comparison to other methods that detect and attempt to remove an already present infection. In another example, the vaccination profile is used for vaccination against previously unknown malicious code. The setting of vaccination markers by the malicious code is analyzed and used to generate the vaccination profile, which does not necessarily requiring recognition of the actual malicious code itself. The vaccination profile is different than signature based method, for example, by including system calls that may appear to be otherwise benign on their own, but are in fact used by the malicious code to detect whether another instance of the malicious code is already installed on the computing device to determine whether to continue infection or abort the infection.

At least some of the systems, methods, apparatus, and/or code instructions described herein do not simply relate to the generate idea of screening for malicious code, but provide a particular approach based on the vaccination profile, for preventing infection by malicious code by emulating an already present infection of another instance of the malicious code to the malicious code attempting infection. Moreover, at least some of the systems, methods, apparatus, and/or code instructions described herein do not simply relate to using a signature of a malicious code to screen for infection by the malicious code, but are based on a new data structure, the vaccination profile, for preventing infection by emulating an already present infection. The vaccination profile includes data to emulate an already present infection by an instance of the malicious code.

The protection provided to computer devices from being infected by malicious code based on the vaccination profile is distinguished, for example, from traditional "code-matching" malicious code scanning programs that are limited to recognizing the presence of previously-identified malicious code, typically by comparing the malicious code to a database of known malicious code, and/or based on signatures of known malicious code. At least some of the systems, methods, apparatus, and/or code instructions described herein protect the computing device from being infected by the malicious code without necessarily identifying the malicious code itself. Therefore, the implementation of the vaccination profile for protection of computing devices from infection as described herein constitutes an improvement in computer functionality, in particular, an improvement to the technical field of cybersecurity.

Moreover, the vaccination profile described herein is different than other "behavior-based" approaches to scanning for malicious code. In contract to "behavior-based" approaches, which simply determine whether the malicious code performs malicious operations (i.e., dangerous and/or unwanted operations such as renaming or deleting files), the vaccination profile described herein is used to emulate infection of an already existing instance of malicious code for preventing another instance of the malicious code in infecting the computing device. The vaccination profile stores actions performed by malicious code to determine whether another instance of the malicious code has already infected the computing device. Such actions performed by the malicious code to determine whether another instance of the malicious code has already infected the computing device may not necessarily be malicious acts themselves, for example, the actual acts may be benign acts of no particular consequence when taken alone. Therefore, other signature and/or behavior based methods do not consider such actions to determine whether another instance of the malicious code has already infected the computing device. Moreover, use of the vaccination profile, which may include acts performed by the malicious code that are benign alone, may prevent infection and/or detect malicious code before any malicious activity has taken place.

At least some of the systems, methods, apparatus, and/or code instructions described herein address the technical problem of malicious code that evolves to evade signature-based detection processes. New versions of the malicious code, which have different signatures, cannot be detected by earlier versions of the signature-based detection processes. Therefore, great effort is expended to try to update the signature-based detection processes to keep up with the evolving malicious code. At least some of the systems, methods, apparatus, and/or code instructions described herein which utilize the vaccination profile described herein, are able to prevent infection by the new versions of the malicious code that are not detected by signature-based detection processes, by emulating infection by an earlier version of the malicious code. The new version of the malicious code attempts to detect the earlier version of the malicious code to prevent another infection of the same computing device by malicious code of the same malware family. The malicious code may avoids re-infection of the computing device (i.e., making sure the computing device is only infected one time by the malicious code of the same family), for example, since there is no advantage for the malware in the re-infection, but in fact, a re-infection might reduce performance of the malicious code, for example, by reducing stability of the computing device due to multiple infections such as when the malicious code nests deep inside the operating system.

At least some of the systems, methods, apparatus, and/or code instructions described herein employ a new data structure, the vaccination profile described herein, that enables a computer security system to do things it could not do before. The vaccination profile approach ensures that malicious threats are identified before infecting a computing device, by emulating an already existing infection of the malicious code to another instance of the malicious code attempting infection of the computing device. The emulation triggers the malicious code attempting infection to abort and/or avoid a re-infection of the computing device.

At least some of the systems, methods, apparatus, and/or code instructions described herein prevent infection by malicious code that would otherwise not be prevented and/or detected by other methods. For example, customized code injected into a system to create a backdoor entry for a hacker. Such malicious code may not necessarily be malicious in and of itself, by allowing other humans and/or other code to do the malicious activity rather than by doing the malicious activity itself, and therefore would not be identified by other methods that are based on detecting malicious behavior and/or based on signatures of known malicious code.

In a further implementation form of the first, second, and third aspects, the method further comprises and/or the system further comprises code instructions for and/or the computer program product further comprises additional instructions for removing the another instance of the malicious code from the computing device according to a process initiating the at least one of the plurality of vaccination artifact system calls.

In a further implementation form of the first, second and third aspects, the at least one vaccination artifact system call includes an indication of respective infection markers stored by the malicious code in a data storage medium for indicating an existing infection to the another instance of the malicious code attempting infection, wherein the existing infection of the client computing device is emulated by providing a false indication of the presence of the infection marker in the data storage medium in response to the at least one vaccination artifact system call issued by the another instance of the malicious code attempting infection.

In a further implementation form of the first, second and third aspects, the certain malicious code aborts a process of infection of the computing device when receiving false data emulating at least one infection marker stored in a storage medium, in response to attempted execution of the at least one of the plurality of vaccination artifacts system calls executed by the certain malicious code.

In a further implementation form of the first, second and third aspects, a first signature of the malicious code is different from a second signature of the another instance of the malicious code, such that an anti-malware program trained to detect the malicious code according to the first signature is unable to detect the another instance of the malicious code according to the first signature.

In a further implementation form of the first, second and third aspects, the at least one vaccination artifact system call comprises operating system queries for detecting at least one infection marker stored in a storage medium, wherein the at least one infection marker indicates to the certain malicious code attempting infection that the computing device is already infected by another instance of the certain malicious code.

In a further implementation form of the first, second and third aspects, the vaccination profile emulates the existing infection by providing false responses to the operating system queries indicating the presence of infection markers.

In a further implementation form of the first, second and third aspects, the operating system queries for detecting infection markers are selected from the group consisting of: detecting a predefined mutex stored in memory, detecting a predefined file stored in a data storage device, detecting a predefined key stored in a system registry, and combinations of the aforementioned.

In a further implementation form of the first, second and third aspects, the at least one vaccination artifact system call comprises operating system instructions for storing at least one infection marker in a storage medium, wherein the at least one infection marker indicates to the certain malicious code attempting infection that the computing device is already infected by another instance of the certain malicious code.

In a further implementation form of the first, second and third aspects, the vaccination profile emulates the existing infection by providing false responses indicating the presence of at least one infection markers in the storage medium to operating system queries issued by the certain malicious code.

In a further implementation form of the first, second and third aspects, the operating system queries for storing infection markers are selected from the group comprising: storing a predefined mutex in memory, storing a predefined file in a data storage device, storing a predefined key in a system registry, and combinations of the aforementioned.

In a further implementation form of the first, second and third aspects, the vaccination profile stores a whitelist of records of benign vaccination artifact system calls, wherein when the monitored at least one of the plurality of vaccination artifact system calls matches a record of the whitelist, the at least one of the plurality of vaccination artifact system calls is passed to the operating system for continued execution thereof.

In a further implementation form of the first, second and third aspects, the vaccination profile stores a blacklist of records of malicious vaccination artifact system calls, wherein when the monitored at least one of the plurality of vaccination artifact system calls matches a record of the blacklist, the at least one of the plurality of vaccination artifact system calls is prevented from passing to the operating system for continued execution thereof.

In a further implementation form of the first, second and third aspects, the vaccination profile stores a set of rules for matching patterns of vaccination artifact system calls, and monitoring comprises monitoring the computing device for the indication of execution of the pattern matching to the set of rules for detection of the indication of execution of the at least one of the plurality of vaccination artifact system calls.

In a further implementation form of the first, second and third aspects, monitoring the computing device comprises intercepting an operating system query for detecting a certain infection marker stored in a storage medium, further comprising analyzing the intercepted operating system query for a matching record stored in the vaccination profile indicative of a corresponding vaccination artifact system call, when no matching record is found: executing a branch calculation procedure to identify an indication of an exit and/or termination in response paths, and returning an exit call to the malicious code when the indication of exit and/or termination is identified.

In a further implementation form of the first, second, and third aspects, the method further comprises and/or the system further comprises code instructions for and/or the computer program product further comprises additional instructions for monitoring the computing device for an indication of execution of a certain system call, analyzing the certain system call for a matching vaccination artifact of the plurality of vaccination artifact system calls stored in the vaccination profile, providing the certain malicious code with a false response to the certain system call when the certain system call does not match any of the plurality of vaccination artifact system calls stored in the vaccination profile, for emulating execution of the certain system call to the malicious code.

In a further implementation form of the first, second, and third aspects, the method further comprises and/or the system further comprises code instructions for and/or the computer program product further comprises additional instructions for computing a score indicative of likelihood of malicious activity according to instructions to access resources of the computing device issued by the process that issued the certain system call, and providing the certain malicious code with the false response when the score is above a threshold indicative of malicious activity.

In a further implementation form of the first, second and third aspects, the another instance of the malicious code comprises another version of the certain malicious code.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS

Figure 1:
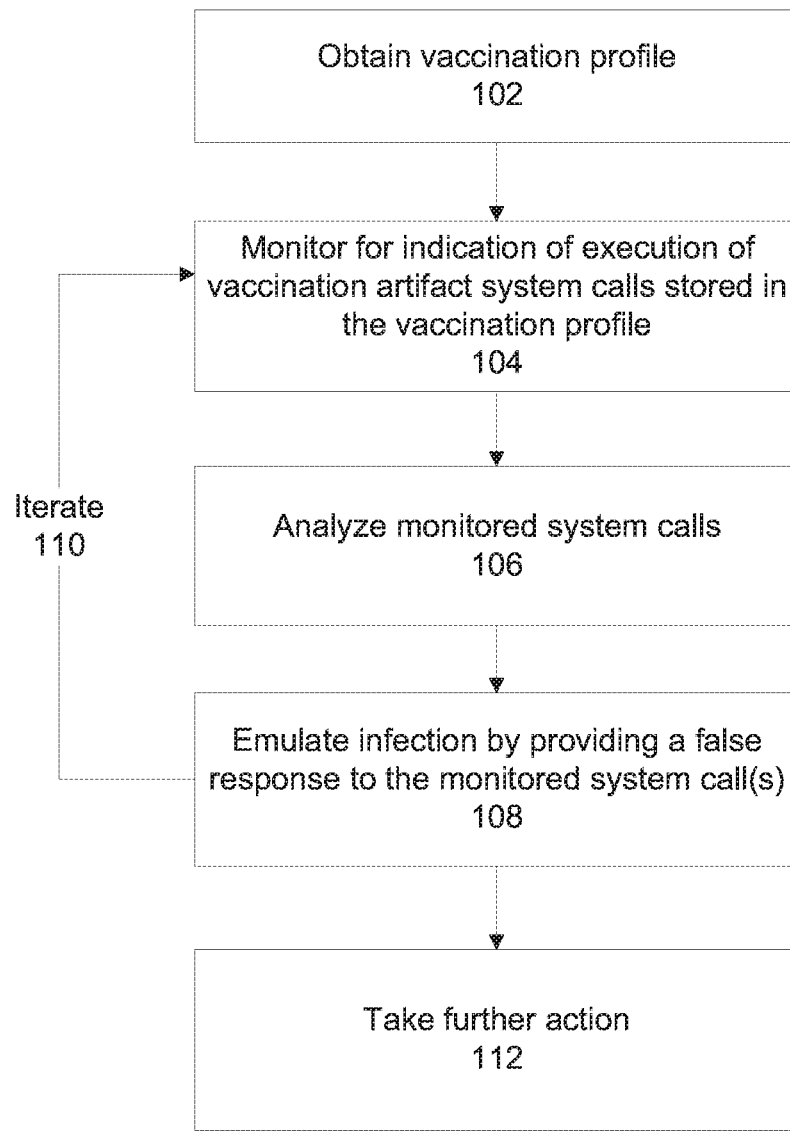
FIG. 1 is a flowchart of a process for vaccination of a computing device against malicious code by emulating an existing instance of the malicious code according to the vaccination profile, in accordance with some embodiments of the present invention.

The present invention, in some embodiments thereof, relates to cybersecurity and, more specifically, but not exclusively, to systems and methods for protecting a computing device against infection by malicious code.

As used herein, the term vaccination refers to the process of protecting of a computing device by emulating an existing infection of malware in response to a system call issued by another instance of the malware. The emulation of existing infection is performed based on the vaccination profile by providing a false response to the system call. In response to receiving the false indication, the malware does not infect the computing device (e.g., aborting the infection process).

As used herein, the term vaccination artifact system call refers to operating system calls (which may sometimes be referred to as operating system queries) to determine whether the computing device is presently infected or not, optionally by detecting the presence of an infection marker in a data storage device. The infection marker may be a predefined value and/or data structure defined by the malicious code. The vaccination artifact system call may include operating system instructions (also referred to herein as system calls) for storing the infection marker in the data storage device. The presence of the stored infection marker is intended to be queried by another instance of the malicious code attempting infection. When the infection marker is detected, the another instance of the malicious code aborts infection of the computing device, as the computing device is already infected.

As used herein, the term system call may sometimes be interchanged with the term operating system query (e.g., when checking whether an infection marker is stored in a data storage device) and/or with the term operating system instructions (e.g., when generating instructions to the operating system to store the infection marker in the data storage device). The system call may refer to operating system queries and/or operating system instructions.

An aspect of some embodiments of the present invention relates to systems, methods, an apparatus, and/or code instructions (i.e., stored in a data storage device, executable by one or more hardware processors) for vaccination of a computing device against infection by malicious code. A vaccination profile storing vaccination artifact system call(s) and optionally associated infection marker(s) is obtained. The vaccination artifact system calls are indicative of a malicious code attempting to identify another instance of the malicious code executing on the computing device prior to the malicious code infecting the computing device.

The vaccination artifact system call(s) may include operating system queries to determine whether the associated infection marker(s) is stored in a data storage device of the computing device. The computing device is monitored for an indication of execution of one or more of the vaccination artifact system call(s) by the malicious code. When attempted execution of one or more of the vaccination artifact system call(s) is identified and/or intercepted, an existing infection of the computing device is emulated to the malicious code that issued the vaccination artifact system call(s) by providing a false response to the vaccination artifact system call(s) issued by the malicious code. For example, in response to a query to determine whether a predefined infection marker is located at a predefined location in memory, the false indication is indicative of the presence of the predefined infection marker, when in fact no such predefined infection marker is stored in memory.

In response to receiving the false response, the malicious code aborts the process of infecting the computing device (i.e., the malicious code does not infect the computing device). The malicious code may avoid infecting the computing device based on the assumption that another instance of the malicious code has already infected the computing device. The malicious code does not infect the computing device, for example, to avoid double infections which may destabilize the computing device.

Optionally, the system call (e.g., operating system query and/or operating system instruction) is hooked, preventing the system from reaching the destination executing process (e.g., the operating system). The system call is processed by the vaccination code, which prepares the false response that fakes the presence of the infection artifact on the computing device and/or fakes execution of instructions for storing the infection artifact on the computing device. Alternatively, system calls are eavesdropped such that the system calls are still processed by the executing destination process (e.g., operating system), with the response to the system call by the execution destination process being hooked, preventing the true response from reaching the malicious code. The false response is sent to the malicious code instead of the true response. In this manner, the reaction of the malicious code is indirectly and/or passively controlled by the false response to prevent infection of the computing device by the malicious code.

The vaccination profile is used by respective client terminals (the computing device described herein is depicted as one example of a client terminal), which are uninfected by malicious code, to vaccinate themselves against infection by malicious code, as described herein.

At least some of the systems, methods, apparatus, and/or code instructions described here relate to the technical problem of protection against infection by malicious code.

At least some of the systems, methods, apparatus, and/or code instructions described herein improve the technology of cybersecurity, by improving the ability of a computing device (e.g., client terminal, server, networking device) to protect itself again infection by malicious code. In particular, improving the ability of the computing device to emulate an existing infection by malicious code, for preventing infection of the computing device by another instance of the malicious code.

At least some of the systems, methods, apparatus, and/or code instructions described herein are related to a vaccination profile that is used to emulate infection of the computing device to malicious code that is attempting to infect the computing device. The emulated infection prevents the malicious code from infecting the computing device.

At least some of the systems, methods, apparatus, and/or code instructions described herein provide technical improvements and/or technical advantages over other cybersecurity methods that protect against infection by malicious code. For example, the vaccination profile described herein prevents infection by the malicious code by emulating an already present infection of an instance of the malicious code to the malicious code attempting infection. The malicious code, which is programmed to avoid re-infection of the computing device, aborts the attempt to infect the computing device based on the emulated infection which is generated according to the vaccination profile. In another example, at least some of the systems, methods, apparatus, and/or code instructions described herein provide protection to a computing device prior to infection by the malicious code, in comparison to other methods that detect and attempt to remove an already present infection. In another example, the vaccination profile is used for vaccination against previously unknown malicious code. The setting of vaccination markers by the malicious code is analyzed and used to generate the vaccination profile, which does not necessarily requiring recognition of the actual malicious code itself.

The vaccination profile is different than signature based method, for example, by including system calls that may appear to be otherwise benign on their own, but are in fact used by the malicious code to detect whether another instance of the malicious code is already installed on the computing device to determine whether to continue infection or abort the infection.

At least some of the systems, methods, apparatus, and/or code instructions described herein do not simply relate to the generate idea of screening for malicious code, but provide a particular approach based on the vaccination profile, for preventing infection by malicious code by emulating an already present infection of another instance of the malicious code to the malicious code attempting infection. Moreover, at least some of the systems, methods, apparatus, and/or code instructions described herein do not simply relate to using a signature of a malicious code to screen for infection by the malicious code, but are based on a new data structure, the vaccination profile, for preventing infection by emulating an already present infection. The vaccination profile includes data to emulate an already present infection by an instance of the malicious code.

The protection provided to computer devices from being infected by malicious code based on the vaccination profile is distinguished, for example, from traditional "code-matching" malicious code scanning programs that are limited to recognizing the presence of previously-identified malicious code, typically by comparing the malicious code to a database of known malicious code, and/or based on signatures of known malicious code. At least some of the systems, methods, apparatus, and/or code instructions described herein protect the computing device from being infected by the malicious code without necessarily identifying the malicious code itself. Therefore, the implementation of the vaccination profile for protection of computing devices from infection as described herein constitutes an improvement in computer functionality, in particular, an improvement to the technical field of cybersecurity.

Moreover, the vaccination profile described herein is different than other "behavior-based" approaches to scanning for malicious code. In contract to "behavior-based" approaches, which simply determine whether the malicious code performs malicious operations (i.e., dangerous and/or unwanted operations such as renaming or deleting files), the vaccination profile described herein is used to emulate infection of an already existing instance of malicious code for preventing another instance of the malicious code in infecting the computing device. The vaccination profile stores actions performed by malicious code to determine whether another instance of the malicious code has already infected the computing device. Such actions performed by the malicious code to determine whether another instance of the malicious code has already infected the computing device may not necessarily be malicious acts themselves, for example, the actual acts may be benign acts of no particular consequence when taken alone.

Therefore, other signature and/or behavior based methods do not consider such actions to determine whether another instance of the malicious code has already infected the computing device. Moreover, use of the vaccination profile, which may include acts performed by the malicious code that are benign alone, may prevent infection and/or detect malicious code before any malicious activity has taken place.

At least some of the systems, methods, apparatus, and/or code instructions described herein address the technical problem of malicious code that evolves to evade signature-based detection processes. New versions of the malicious code, which have different signatures, cannot be detected by earlier versions of the signature-based detection processes. Therefore, great effort is expended to try to update the signature-based detection processes to keep up with the evolving malicious code. At least some of the systems, methods, apparatus, and/or code instructions described herein which utilize the vaccination profile described herein, are able to prevent infection by the new versions of the malicious code that are not detected by signature-based detection processes, by emulating infection by an earlier version of the malicious code. The new version of the malicious code attempts to detect the earlier version of the malicious code to prevent another infection of the same computing device by malicious code of the same malware family. The malicious code may avoids re-infection of the computing device (i.e., making sure the computing device is only infected one time by the malicious code of the same family), for example, since there is no advantage for the malware in the re-infection, but in fact, a re-infection might reduce performance of the malicious code, for example, by reducing stability of the computing device due to multiple infections such as when the malicious code nests deep inside the operating system.

At least some of the systems, methods, apparatus, and/or code instructions described herein employ a new data structure, the vaccination profile described herein, that enables a computer security system to do things it could not do before. The vaccination profile approach ensures that malicious threats are identified before infecting a computing device, by emulating an already existing infection of the malicious code to another instance of the malicious code attempting infection of the computing device. The emulation triggers the malicious code attempting infection to abort and/or avoid a re-infection of the computing device.

At least some of the systems, methods, apparatus, and/or code instructions described herein prevent infection by malicious code that would otherwise not be prevented and/or detected by other methods. For example, customized code injected into a system to create a backdoor entry for a hacker. Such malicious code may not necessarily be malicious in and of itself, by allowing other humans and/or other code to do the malicious activity rather than by doing the malicious activity itself, and therefore would not be identified by other methods that are based on detecting malicious behavior and/or based on signatures of known malicious code.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term client computing device may refer to the computing device, which is one client terminal of multiple client terminals that are vaccinated based on the vaccination profile described herein. The terms client computing device and computing device may sometimes be interchanged.

Figure 2:
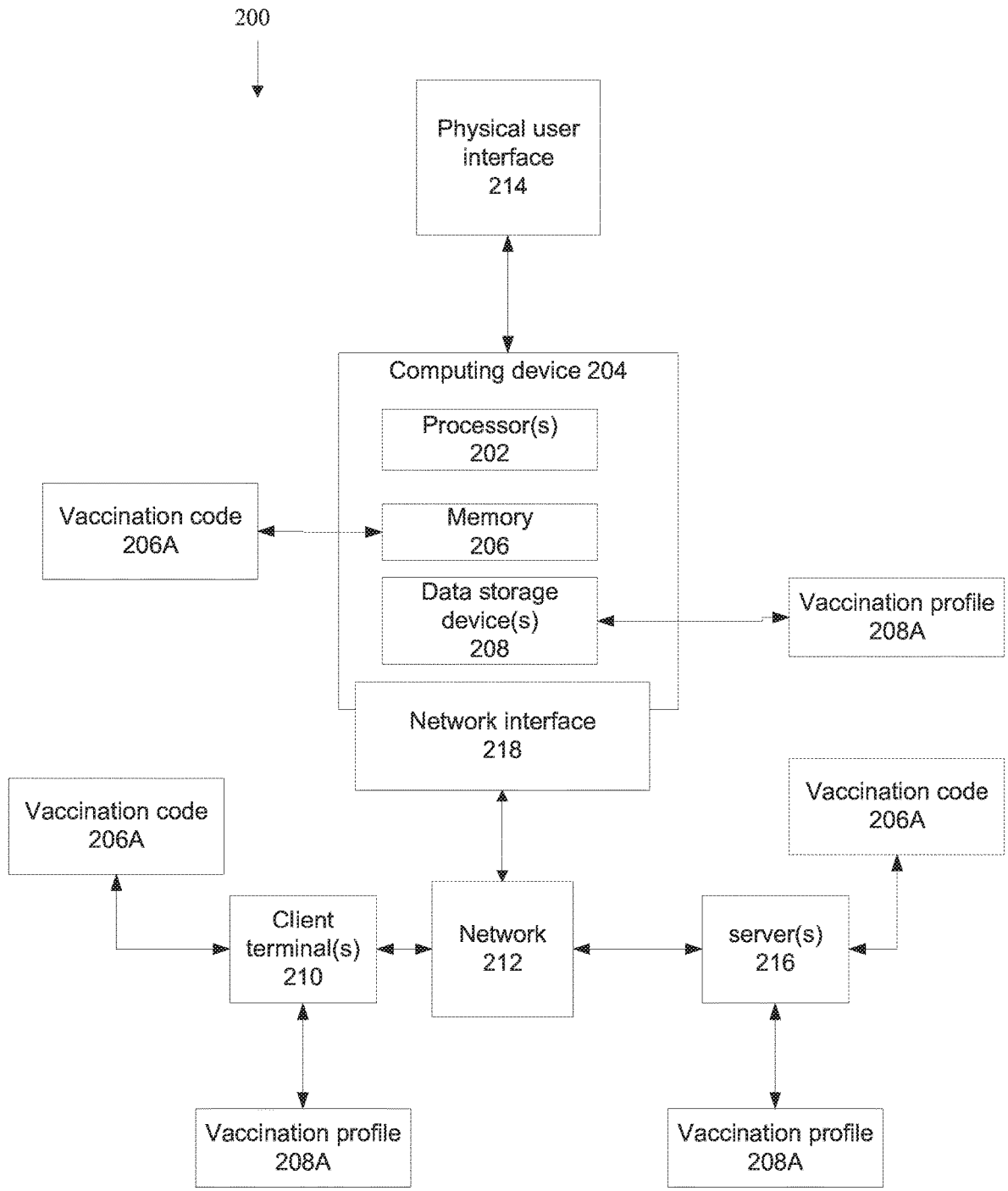
FIG. 2 is a block diagram of components of a system for vaccination against malicious code by emulating an existing instance of the malicious code according to the vaccination profile, in accordance with some embodiments of the present invention.

Reference is now made to FIG. 1, which is a flowchart of a process for vaccination of a computing device against malicious code by emulating an existing instance of the malicious code according to the vaccination profile, in accordance with some embodiments of the present invention. Reference is also made to FIG. 2, which is a block diagram of components of a system 200 for vaccination against malicious code by emulating an existing instance of the malicious code according to the vaccination profile, in accordance with some embodiments of the present invention. System 200 may implement the acts of the methods described with reference to FIG. 1, by processor(s) 202 of a computing device 204 executing code instructions stored in a memory 206 (also referred to as a program store). Computing device 204 may be implemented as, for example one or more and/or combination of: a group of connected devices, a client terminal, a server, a virtual server, a computing cloud, a virtual machine, a desktop computer, a thin client, and/or a mobile device (e.g., a Smartphone, a Tablet computer, a laptop computer, a wearable computer, glasses computer, and a watch computer).

Multiple architectures of system 200 based on computing device 204 may be implemented. For example:

Computing device 204 may be implemented as one or more client terminals 210 that communicate with a server(s) 216 over a network 212. Computing device 204 is as an example of one of the client terminals 210. Server(s) 216 provides client terminals 210 and computing device 204 with vaccination code 206A and/or with vaccination profile 208A, for example, by acting as a storage server from which provides client terminals 210 and computing device 204 may download vaccination code 206A and/or with vaccination profile 208A. In another example, server(s) 216 transmits updates of vaccination code 206A and/or with vaccination profile 208A to client terminals 210 and computing device 204. Server(s) 216 may locally generate vaccination profile 208A by executing locally stored vaccination profile generation code, for example, as described with reference to co-filed Application. The vaccination profile 208A and/or vaccination code 206A, is provided to client terminals(s) 210 and/or computing device 204 over network 212, for example, transmitted over network 212, and/or accessed by a software interface, for example, an application programming interface (API) and/or software development kit (SDK). Each client terminal(s) 210 and/or computing device 204 may store a respective copy of vaccination code 206A and/or vaccination code 206A. Client terminal(s) 210 and/or computing device 204 execute vaccination code 206A according to the vaccination profile 208A for vaccination against malicious code, as described herein.

Computing device 204 may be implemented as a standalone device (e.g., kiosk, client terminal, smartphone, server) that include locally stored vaccination profile creation code instructions that creates vaccination profile 208A, for example, as described with reference to co-filed Application and includes vaccination code 206A that implement one or more of the acts described with reference to FIG. 1. In such an implementation, vaccination profile 208A is automatically generated by computing device 204, by executing the vaccination generation code. Computing device 204 vaccinates itself based on the created vaccination profile 208A, by executing code vaccination code 206A.

Computing device 204 may be implemented as one or more servers (e.g., network server, web server, a computing cloud, a virtual server) that provides vaccination services to client terminal(s) 210 and/or server(s) 216 over network 212. Computing device 204 may include locally stored vaccination profile creation code that creates vaccination profile 208A (e.g., as described with reference to co-filed Application and/or vaccination code 206A that implement one or more of the acts described with reference to FIG. 1 and/or vaccination profile 208A. In such an implementation, client terminal(s) 210 and/or server(s) 216 communicate with computing device 204 over network 212 for immunization thereof against malicious code. Communication may be performed, for example, via a software interface such as API and/or SDK. Code may be locally installed on each client terminal(s) 210 and/or server(s) 216 for communication with computing device 204, for example, for transmitting monitoring data for analysis by computing device 204, and receiving instructions from computing device 204 when an attempted infection by the malicious code is detected. Computing device 204 may transmit instructions for emulation of an existing infection (i.e., vaccination) by client terminal(s) 210 and/or server(s) 216 according to the vaccination profile.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores vaccination code 206A that implements one or more features and/or acts of the method described with reference to FIG. 1 when executed by hardware processor(s) 202 and/or stores vaccination profile 208A and/or may store vaccination code that creates he vaccination profile as described with reference to co-filed Application.

Computing device 204 may include data storage device(s) 208 for storing data, for example, vaccination profile 208A. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 and/or server(s) 216 include and/or are in communication with one or more physical user interfaces 214 that include a mechanism for a user to interact with the vaccination profile and/or vaccination process, and/or view the vaccination profile and/or view the vaccination process. Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented as, for example, as a desktop computer, a server, a virtual server, a network server, a web server, a virtual machine, a thin client, and a mobile device.

Referring now back to FIG. 1, at 102, the vaccination profile is obtained. The vaccination profile may be obtained by the computing device, which may be one of multiple client terminals that obtain the vaccination profile from a server. The vaccination profile may be obtained from the server(s) over the network (e.g., downloaded and/or transmitted) and/or via a portable storage device (e.g., CD ROM, disk on key). The vaccination profile may be provided for local storage and execution by the computing device. Alternatively or additionally, the vaccination profile may be stored on the server and remotely accessed over the network by the computing device.

The vaccination profile may be created, for example, as described with reference to Patent Application, co-filed with the present application.

The vaccination profile may be provided in its entirety (i.e., including vaccination artifact system calls of multiple malicious codes), and/or updates to the vaccination profile (e.g., newly identified vaccination artifact system calls of individual malicious codes) may be provided to client terminals that already store local copies of the vaccination profile.

The vaccination profile may be implemented as, for example, a database of vaccination artifact system calls, a text based (i.e., human readable) version of the vaccination artifact system calls, a compiled and/or binary (i.e., machine readable but not human readable) version of the vaccination artifact system calls, a script, a library file, a plug-in, and code instructions.

The vaccination profile includes vaccination artifact system calls, optionally for multiple different malicious codes. It is noted that malicious codes may use the same vaccination artifact system calls, and/or different malicious codes may use their own unique vaccination artifact system calls. However, it is noted that the identity of the malicious code is not necessary for vaccination of client computing devices using the vaccination artifact system calls.

The vaccination profile may store individual vaccination artifact system calls, and/or may store a set of rules for matching patterns of vaccination artifact system calls. For example, the set of rules may define a sequence of execution of different vaccination artifact system calls, and/or the set of rules may define parallel execution of multiple vaccination artifact system calls.

The vaccination artifact system calls are indicative of an attempt to identify malicious code executing on one or more of the client terminals (e.g., the computing device) prior to another instance of the malicious code infecting the respective client terminal. The another instance of the malicious code first attempts to determine whether the respective client terminal (e.g., computing device) is already infected with the malicious code. The another instance of the malicious code only attempts to infect the client computing device when the client computing device is not already infected by the malicious code. When the another instance of the malicious detects that the client computing device is already infected by the malicious code, the another instance of the malicious code does not attempt infection of the client computing device (e.g., aborts the infection process).

Optionally, the vaccination artifact system call(s) of the vaccination profile include respective indications of infection markers. The infection markers are stored by the malicious code (i.e., during infection of the host computing device) in a data storage medium (e.g., volatile such as memory, and/or non-volatile such as a hard drive) for indicating an existing infection to another instance of the malicious code attempting infection. The existing infection of the computing device (and/or other client terminals) is emulated by providing a false indication of the presence of the infection marker in the data storage medium in response to the vaccination artifact system call(s) issued by the another instance of the malicious code attempting infection, as described herein.

Optionally, the vaccination artifact system call(s) include operating system queries for detecting infection marker(s) stored in a storage medium (e.g., volatile such as memory, and/or non-volatile such as a hard drive). The infection marker(s) are indicative that the computing device (and/or respective client terminals) is already infected by the malicious code. The infection marker(s) are used by the another instance of the malicious code attempting infection to determine that the respective computing device and/or client terminal is already infected by the malicious code, and trigger the another instance of the malicious code to abort the process of infecting the computing device and/or respective client terminal, as described herein. Exemplary operating system queries for detecting infection markers include: detecting a predefined mutex stored in memory, detecting a predefined file stored in a data storage device, detecting a predefined key stored in a system registry, and combinations of the aforementioned Alternatively or additionally, the vaccination artifact system call(s) include operating system instructions for storing infection marker(s) in a storage medium (e.g., volatile and/or non-volatile). Exemplary operating system queries for storing infection markers include: storing a predefined mutex in memory, storing a predefined file in a data storage device, storing a predefined key in a system registry, and combinations of the aforementioned.

The operating system instructions for storing infection marker(s) in the storage medium may be issued by the malicious code during the initial infection of the client computing device. The operating system instructions for detecting infection marker(s) stored in the storage medium may be issued by the malicious code during the initial infection of the client computing device, prior to issuing instructions for storing the infection marker. When the malicious code does not detect the presence of the infection marker stored in the storage medium, the malicious code issues instructions for storing the infection marker. Immunization against infection may be performed by providing a false indication to the malicious code that the infection marker is already stored on the storage device, in response to the query to detect the presence of the infection marker and/or in response to instructions to store the infection marker. Alternatively or additionally, immunization against infection may be performed by providing a false indication to the malicious code that the infection marker has been successfully stored on the storage medium (when in fact the infection marker has not been stored, but the storage instructions have been intercepted) in response to instructions to store the infection marker.

At 104, the computing device is monitored for an indication of execution of one or more of the vaccination artifact system calls stored in the vaccination profile. Optionally, the monitoring is performed for an indication of execution of vaccination artifact system call(s) associated with one or more predefined infection markers stored in the vaccination profile, for example, detecting the presence of the predefined infection markers being stored in a storage device, and/or for storing one or more predefined infection markers in the storage device. The infection marker may be significant for helping to differentiate between benign system calls and malignant system calls, for example, a certain system call is matched to a certain vaccination artifact system call in the vaccination profile. The matched vaccination artifact system call however, may be benign when the value associated with the certain system call is not matched to the infection marker associated with the matched vaccination artifact system call, or may be malicious when the value associated with the certain system call is matched to the infection marker associated with the matched vaccination artifact system call.

System calls may be monitored by attempting to match each system call to a corresponding vaccination artifact system call stored in the vaccination profile. Matching may be performed, for example, by matching code that performs a look-up operation with the vaccination profile. The vaccination artifact system calls may be arranged according to a defined order (e.g., alphabetical ascending, and/or according to an indexing method) and/or hierarchy (e.g., sorted tree) designed to make the look-up process fast and/or computationally efficient.

The monitoring may be performed, for example, by code that hooks and/or intercepts a predefined set of system calls according to the vaccination artifact system calls stored in the vaccination profile, before the system calls reach the destination execution process (e.g., the operating system). The fake response is sent to the malicious code instead of the true response, optionally without execution of the original system call, to trigger prevention of infection of the computing device by malicious code. Alternatively or additionally, the monitoring is performed by eavesdropping on the system calls (e.g., sniffing data structures storing the system calls that correspond to the vaccination artifact system calls), such that the system calls are still processed by the executing destination process (e.g., operating system). The reply message generated by the executing destination process (e.g., operating system) in response to the system call may be hooked and/or intercepted, preventing the true response from reaching the malicious code. The false response is sent to the malicious code instead of the true response.

The monitoring may include collection of additional data, for example, a timestamp associated with each system call corresponding to the vaccination artifact system calls, the type of memory associated with the system call (e.g., volatile or permanent), and/or the value of the infection marker(s) associated with the system call corresponding to the vaccination artifact system calls, for example, the name of the file that the malicious code is requesting to determine if stored in a data storage device.

At 106, the monitored system calls corresponding to the vaccination artifact system calls are analyzed. One or more analysis methods may be implemented.

Optionally, the vaccination profile stores a whitelist of records of benign vaccination artifact system calls. The monitored systems calls that correspond to the vaccination artifact system calls are analyzed to determine whether a match exists with one or more records of the whitelist. The system calls that match records of the whitelist are determined to be benign. The system calls that match records of the whitelist may be passed to the operating system for continued execution thereof.

Alternatively or additionally, the vaccination profile stores a blacklist of records of malicious vaccination artifact system calls. The monitored systems calls that correspond to the vaccination artifact system calls are analyzed to determine whether a match exists with one or more records of the blacklist.

The system calls that match records of the blacklist are prevented from passing to the operating system for continued execution thereof. The system calls that match records of the blacklist are used to emulate successful execution of the respective system calls to the malicious code, as described with reference to act 108.

Alternatively or additionally, the vaccination profile stores a set of rules for matching patterns of vaccination artifact system calls. The monitored system calls are analyzed as patterns, for example, according to a sequence of issuance of the system calls. The pattern of the monitored system calls is evaluated with respect to the set of rules for detection of the indication of execution of the pattern of vaccination artifacts system calls.

Alternatively or additionally, the monitored (e.g., intercepted) system query is for detecting a certain marker stored in a storage medium. However, the system query does not match to any vaccination artifact system calls stored in the vaccination profile, and/or the system query does match to one or more vaccination artifact system calls stored in the vaccination profile but the certain infection marker does not match the predefined infection marker stored in association with the matched vaccination artifact system call. In such a case, the analysis is performed by executing a branch calculation procedure to identify an indication of an exit and/or termination in response paths. The emulation of infection is performed (with reference to act 108), by returning an exit call to the malicious code when the indication of exit and/or termination is identified. Alternatively or additionally, in such a case when the system query does not match to any vaccination artifact system calls stored in the vaccination profile, a false response is provided to the monitored system call to emulate infection (as described with reference to act 108).

The emulation of infection when no matching vaccination artifact system calls and/or no matching infection markers are found may be triggered by an analysis of other actions of the potential malicious code that issued the intercepted system query. Since no matching vaccination artifact system calls and/or no matching infection markers are found, the potential malicious code cannot be determined with sufficiency accuracy to represent malicious code, and the intercepted system query cannot be determined with sufficiency accuracy to represent malicious actions. The potential malicious code may be benign code, and the intercepted system query may be for benign actions. In such cases, an analysis of one or more actions performed by the potential malicious code may be analyzed to increase the probability of determining whether the potential malicious code is malicious or benign. Instructions to access resources of the host computing device by the potential malicious code may be analyzed, for example, execution time, installation errors, network activity, process creation, thread creation, file creation, and registry creation. The instructions to access resources may be analyzed individual and/or over a time interval to compute a probability score (e.g., a value from 0-100, or a binary value indicative of malicious or benign, or other scoring scales). The score acts as a surrogate marker for whether the potential vaccination artifact system call is malicious or benign. When the score is over a threshold (or equal to a predefined value) indicating likelihood of malicious activity, the false indication may be generated. The score may be computed, for example, based on known associations between certain actions (e.g., instructions to access resources of the host computing device) and malicious activity, for example, by a trained statistical classifier that receives the action (e.g., instructions to access resources of the host computing device) and outputs a probability of likelihood of the action being malicious.

It is noted that the whitelist, blacklist, and/or pattern stored in the vaccination profile may be created, for example, as described with reference to co-filed application.

At 108, an existing infection of the computing device is emulated by providing false responses indicating the presence of infection markers to the operating system queries (i.e., calls) issued by the malicious code. The vaccination profile is used to emulate the existing infection of the computing device by the malicious code, which prevents of infection of the computing device by another instance of the malicious code. The another instance of the malicious code aborts the process of infection of the computing device when receiving the false data emulating infection marker(s) stored in a storage medium, in response to execution of vaccination artifact system call(s) stored by the vaccination profile (i.e., execution of one or a pattern of the vaccination artifact system calls).

The false response protects the computing device from infection by another version of the malicious code. The another version of the malicious code may be designed to evade signature based antimalware programs, but is prevented from infecting the computing device based on the false response. A previous signature of the malicious code is different from an updated signature of the malicious code (e.g., an updated version of the malicious code). An antimalware program trained to detect the malicious code according to the previous signature is unable to detect the another instance of the malicious code according to the updated signature. However, the malware code with updated signature is prevented from infecting the computing device when the false response is provided, even when the updated signature is unknown.

The false response is provided in response to the system call(s) issued by the malicious code that were matched to vaccination artifact system call(s) stored in the vaccination profile. It is noted that the matched system call(s) were intercepted and prevented from being passed to the operating system for execution thereof. The false response is provided to trigger the malicious code into aborting infection of the malicious code, as would otherwise occur if in fact the computing device was infected by another instance of the malicious code.

Optionally, the vaccination profile is used to emulate the existing infection by providing false responses indicating the presence of infection marker(s) in the storage medium to operating system queries issued by the certain malicious code.

Optionally, as discussed herein, when system calls cannot be matched to records of vaccination artifact system calls stored in the vaccination profile, and/or when markers associated with the system calls cannot be matched to records of infection markers stored in the vaccination profile, the false response may be generated in response to the unmatched system call(s). The lack of match may be indicative of a new unknown malicious code, which may be prevented from infecting the computing device even when the new malicious code has not yet been discovered. The lack of match may be based on a lack of match to the whitelist and/or blacklist, indicating a completely new and unknown malicious code.

The vaccination artifact system call(s) stored by the vaccination profile and matched to the system calls issued by the malicious code may include an indication of respective infection markers, where the infection markers are stored by the malicious code in a data storage medium during an initial infection of the respective computing device. The stored infection markers are placed by the malicious code for indicating an existing infection to another instance of the malicious code attempting infection. For example, the vaccination artifact system call may be a query to the operating system to check a predefined filed stored on a hard drive, and the infection marker is a copy of the predefined file. The existing infection of the computing devices is emulated by providing a false indication of the presence of the infection marker in the data storage medium in response to the vaccination artifact system call(s) issued by the another instance of the malicious code attempting infection. For example, in response to the another instance of the malicious code issuing a query to determine if the predefined file is stored on the hard drive, a false indication that the file is actually stored is provided. It is noted that the actual value of the infection marker may not necessarily be required, when the false indication may be provided in response to the query by another instance of the malicious code without requiring knowing the actual value of the infection marker. In other cases, such as possible benign uses of the vaccination artifact system call(s), the value of the infection marker may be required for providing the false indication.

At 110, one or more features described with reference to acts 104-108 may be iterated. For example, for malicious that stores the infection marker in volatile memory, the emulation of infection may be repeated every time the computer system is reset. When the system is reset, the volatile memory is refreshed, wiping out any stored infection markers. The malicious code may attempt to re-store the infection marker(s) in the volatile memory, and/or may attempt to re-verify if infection marker(s) are stored in the volatile memory. The emulation of infection is iterated accordingly to prevent infection by the malicious code.

At 112, further action is taken in response to the generated false indication that prevented the malicious code from infection the computing device.

Optionally, an alert indicating an attempted infection that was prevented is raised, for example, a pop-up window is presented on the screen of the computing device, a log is generated storing data associated with the event, and/or a message is sent to an administrative server.

Alternatively or additionally, the malicious code that issues the system call is quarantined, for example, placed in a sandbox and/or isolated. Attempts may be made to remove (e.g., delete) the malicious code, for example, according to the process that initiated the system call.

Alternatively or additionally, a copy of the malicious code and/or additional data (e.g., the matched vaccination artifact system call(s) generated by the malicious code, the associated infection marker, and/or the provided false response) is transmitted to a server for analysis. For example, transmitted to an administrative server of the provider of the vaccination profile for further analysis for updating the vaccination profile, and/or for identifying a signature of the malicious code for updating an antimalware program.

Alternatively or additionally, the malicious code may be transmitted for automatic analysis to identify additional vaccination artifact system call(s) and optionally related infection markers, for adding to the vaccination profile. The computing device may transmit the malicious code to a server, optionally via a defined software interface (e.g., vaccination profile interface), for automatic analysis of the malicious code for identifying vaccination artifact system call(s) and optionally related infection markers that are added to the vaccination profile, for example, as described with reference to co-filed Application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant malicious codes and systems calls will be developed and the scope of the terms malicious code and system calls are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of vaccination of a computing device against infection by malicious code, comprising:

obtaining from a server over a network a vaccination profile documenting a plurality of vaccination artifact system calls performed by a malicious code attempting to identify another instance of the malicious code executing on the computing device prior to the malicious code infecting the computing device;

monitoring the computing device to detect an indication of execution of at least one of the plurality of vaccination artifact system calls by the malicious code, wherein the executed at least one of the plurality of vaccination artifact system calls comprises at least one operating system call for acquiring data at the storage level indicating the presence of at least one infection marker in a storage medium of the computing device;

in response to the detected indication, generating a false response indicative of the presence of at least one infection marker in the storage medium of the computing device as an outcome of execution of at least one of the plurality of vaccination artifact system calls by the malicious code, wherein the false response indicative of the presence of at least one infection marker is generated at the operating system level without executing the at least one operating system call for acquiring data at the storage level; and providing the false response to the at least one of the plurality of vaccination artifact system calls for emulating an existing infection of the computing device by another instance of the malicious code according to the indication of execution of at least one of the plurality of vaccination artifact system calls, wherein the emulation of the existing infection prevents infection of the computing device by the malicious code.

2. The method according to claim 1, further comprising removing the another instance of the malicious code from the computing device according to a process initiating the at least one of the plurality of vaccination artifact system calls.

3. The method according to claim 1, wherein a first signature of the malicious code is different from a second signature of the another instance of the malicious code, such that an anti-malware program trained to detect the malicious code according to the first signature is unable to detect the another instance of the malicious code according to the first signature.

4. The method according to claim 1, wherein the at least one vaccination artifact system call comprises operating system queries for detecting the at least one infection marker stored in a storage medium, wherein the at least one infection marker indicates to the malicious code attempting infection that the computing device is already infected by another instance of the malicious code.

5. The method according to claim 4, wherein the vaccination profile emulates the existing infection by providing false responses to the operating system queries indicating the presence of the at least one infection marker.

6. The method according to claim 4, wherein the operating system queries for detecting the at least one infection marker are selected from the group consisting of: detecting a predefined mutex stored in memory, detecting a predefined file stored in a data storage device, detecting a predefined key stored in a system registry, and combinations of the aforementioned.

7. The method according to claim 1, wherein the at least one vaccination artifact system call comprises operating system instructions for storing the at least one infection marker in the storage medium, wherein the at least one infection marker indicates to the malicious code attempting infection that the computing device is already infected by another instance of the malicious code.

8. The method according to claim 7, wherein the vaccination profile emulates the existing infection by providing false responses indicating the presence of the at least one infection marker in the storage medium to operating system queries issued by the malicious code.

9. The method according to claim 7, wherein the operating system queries for storing the at least one infection marker are selected from the group comprising: storing a predefined mutex in memory, storing a predefined file in a data storage device, storing a predefined key in a system registry, and combinations of the aforementioned.

10. The method according to claim 1, wherein the vaccination profile stores a whitelist of records of benign vaccination artifact system calls, wherein when the monitored at least one of the plurality of vaccination artifact system calls matches a record of the whitelist, the at least one of the plurality of vaccination artifact system calls is passed to the operating system for continued execution thereof.

11. The method according to claim 1, wherein the vaccination profile stores a blacklist of records of malicious vaccination artifact system calls, wherein when the monitored at least one of the plurality of vaccination artifact system calls matches a record of the blacklist, the at least one of the plurality of vaccination artifact system calls is prevented from passing to the operating system for continued execution thereof.

12. The method according to claim 1, wherein the vaccination profile stores a set of rules for matching patterns of vaccination artifact system calls, and monitoring comprises monitoring the computing device for the indication of execution of the pattern matching to the set of rules for detection of the indication of execution of the at least one of the plurality of vaccination artifact system calls.

13. The method according to claim 1, wherein monitoring the computing device comprises intercepting an operating system query for detecting the at least one infection marker stored in the storage medium, further comprising analyzing the intercepted operating system query for a matching record stored in the vaccination profile documenting a corresponding vaccination artifact system call, when no matching record is found: identifying an exit and/or termination in response paths related to the corresponding vaccination artifact system call, and returning an exit call to the malicious code when the indication of exit and/or termination is identified.

14. The method according to claim 1, further comprising:
monitoring the computing device for an indication of execution of a certain system call;
analyzing the certain system call for a matching vaccination artifact of the plurality of vaccination artifact system calls stored in the vaccination profile;
providing the malicious code with a false response to the certain system call when the certain system call does not match any of the plurality of vaccination artifact system calls stored in the vaccination profile, for emulating execution of the certain system call to the malicious code.

15. The method of claim 14, further comprising:
computing a score indicative of likelihood of malicious activity according to instructions to access resources of the computing device issued by the process that issued the certain system call, and providing the malicious code with the false response when the score is above a threshold indicative of malicious activity.

16. The method according to claim 1, wherein the another instance of the malicious code comprises another version of the malicious code.

17. The method of claim 1, wherein the executed at least one of the plurality of vaccination artifact system calls is hooked and prevented from reaching a destination execution process that acquires data at the storage level, and the false response is provided to the executed at least one of the plurality of vaccination artifact system calls faking execution of the destination execution process.

18. The method of claim 1, wherein the executed at least one of the plurality of vaccination artifact system calls are eavesdropped during processing by a destination execution process that acquires data at the storage level, and a response by the destination execution process to the executed at least one of the plurality of vaccination artifact system calls is hooked, preventing a true response from reaching the malicious code, wherein the false responses is sent to the malicious code instead of the true response.

19. The method of claim 1, wherein a previous signature of the another instance of the malicious code is different from an updated signature of the malicious code that executes the at least one of the plurality of vaccination artifact system calls.

20. The method of claim 1, wherein the presence of the at least one infection marker in the storage medium is emulated when the at least one infection marker is not actually stored on the storage medium.

21. A system for vaccination of a computing device against infection by malicious code, comprising:
- a non-transitory memory having stored thereon a code for execution by at least one hardware processor, the code comprising:
  - code for obtaining from at least one server over a network a vaccination profile documenting a plurality of vaccination artifact system calls performed by a malicious code attempting to identify another instance of the malicious code executing on the computing device prior to the malicious code infecting the computing device;
  - code for monitoring the computing device to detect an indication of execution of at least one of the plurality of vaccination artifact system calls by the malicious code,
  - wherein the executed at least one of the plurality of vaccination artifact system calls comprises at least one operating system call for acquiring data at the storage level indicating the presence of at least one infection marker in a storage medium of the computing device;
  - code for generating, in response to the detected indication, a false response indicative of the presence of at least one infection marker in the storage medium of the computing device as an outcome of execution of at least one of the plurality of vaccination artifact system calls by the malicious code,
  - wherein the false response indicative of the presence of at least one infection marker is generated at the operating system level without executing the at least one operating system call for acquiring data at the storage level; and
  - code for providing the false response to the at least one of the plurality of vaccination artifact system calls for emulating an existing infection of the computing device by another instance of the malicious code according to the indication of execution of at least one of the plurality of vaccination artifact system calls, wherein the emulation of the existing infection prevents infection of the computing device by the malicious code.

22. A computer program product for vaccination of a computing device against infection by malicious code, comprising:
- a non-transitory memory having stored thereon a code for execution by at least one hardware processor, the code comprising:
  - instructions for obtaining a vaccination profile documenting a plurality of vaccination artifact system calls performed by a malicious code attempting to identify another instance of the malicious code executing on the computing device prior to the malicious code infecting the computing device;
  - instructions for monitoring the computing device to detect an indication of execution of at least one of the plurality of vaccination artifact system calls by the malicious code,
  - wherein the executed at least one of the plurality of vaccination artifact system calls comprises at least one operating system call for acquiring data at the storage level indicating the presence of at least one infection marker in a storage medium of the computing device;
  - instructions for generating, in response to the detected indication, a false response indicative of the presence of at least one infection marker in the storage medium of the computing device as an outcome of execution of at least one of the plurality of vaccination artifact system calls by the malicious code,
  - wherein the false response indicative of the presence of at least one infection marker is generated at the operating system level without executing the at least one operating system call for acquiring data at the storage level; and
  - instructions for providing the false response to the at least one of the plurality of vaccination artifact system calls for emulating an existing infection of the computing device by another instance of the malicious code according to the indication of execution of at least one of the plurality of vaccination artifact system calls, wherein the emulation of the existing infection prevents infection of the computing device by the malicious code.

* * * * *